(12) United States Patent
Sakurai et al.

(10) Patent No.: US 8,917,778 B2
(45) Date of Patent: Dec. 23, 2014

(54) IMAGE PROCESSING APPARATUS AND IMAGE PROCESSING METHOD

(75) Inventors: Hironari Sakurai, Tokyo (JP); Junichi Tanaka, Kanagawa (JP); Kazushi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 360 days.

(21) Appl. No.: 12/779,067

(22) Filed: May 13, 2010

(65) Prior Publication Data

US 2010/0315555 A1 Dec. 16, 2010

(30) Foreign Application Priority Data

Jun. 11, 2009 (JP) ................................. P2009-140367

(51) Int. Cl.
*H04N 7/12* (2006.01)
*H04N 11/02* (2006.01)
(Continued)

(52) U.S. Cl.
CPC ............... *H04N 9/8047* (2013.01); *H04N 5/21* (2013.01); *H04N 5/44513* (2013.01); *H04N 5/44543* (2013.01); *H04N 9/8045* (2013.01); *H04N 21/4334* (2013.01); *H04N 21/44* (2013.01); *H04N 21/84* (2013.01); *H04N 19/00066* (2013.01); *H04N 19/00145* (2013.01); *H04N 19/00278* (2013.01); *H04N 19/00909* (2013.01); *H04N 19/00781* (2013.01); *H04N 19/00139* (2013.01); *H04N 19/00896* (2013.01); *H04N 19/00303* (2013.01); *H04N 19/00545* (2013.01); *H04N 5/85* (2013.01)
USPC .................. 375/240.29; 375/240.26

(58) Field of Classification Search
None
See application file for complete search history.

(56) References Cited

U.S. PATENT DOCUMENTS

2008/0186413 A1* 8/2008 Someya et al. ............... 348/739
2008/0199090 A1* 8/2008 Tasaka et al. ................. 382/233
(Continued)

FOREIGN PATENT DOCUMENTS

JP 07-240924 9/1995
JP 2001-202373 7/2001
(Continued)

OTHER PUBLICATIONS

Office Action issued by Japanese Patent Office on Nov. 6, 2012, in Japanese patent application No. 2009-140367.

*Primary Examiner* — Joseph Ustaris
*Assistant Examiner* — Kevin McInnish
(74) *Attorney, Agent, or Firm* — Finnegan, Henderson, Farabow, Garrett & Dunner, LLP

(57) ABSTRACT

An image processing apparatus includes: a receiving unit which receives image data of program contents and genre information regarding the program contents; a determining unit which determines a characteristic parameter indicating characteristics of a filter filtering a local image obtainable by decoding encoding data, which is generated by encoding the image data received by the receiving unit, in accordance with the genre information received by the receiving unit; a characteristic changing unit which changes the characteristics of the filter in accordance with the characteristic parameter determined by the determining unit; and an encoding unit which generates the encoding data by encoding the image data received by the receiving unit by executing a prediction process by use of a local decoded image filtered in accordance with the characteristics of the filter changed by the characteristic changing unit.

17 Claims, 10 Drawing Sheets

| NOISE PREFERENCE FACTORS WEIGHT | MOVING (7) | INPUT (3) | TEXTURE (5) | TOTAL SCORE | FILTER STRENGTH PARAMETER |
|---|---|---|---|---|---|
| NEWS/REPORTS | 4 | 2 | 3 | 9 | MIDDLE |
| SPORTS | 7 | 3 | 3 | 13 | LARGE |
| INFORMATION/WIDE SHOW | 4 | 2 | 3 | 9 | MIDDLE |
| DRAMAS | 4 | 2 | 3 | 9 | MIDDLE |
| MUSIC | 6 | 2 | 5 | 13 | LARGE |
| VARIETY SHOWS | 6 | 2 | 3 | 11 | LARGE |
| MOVIES | 4 | 2 | 3 | 9 | MIDDLE |
| ANIMATION/SPECIAL EFFECT SHOOTING | 4 | 2 | 3 | 9 | MIDDLE |
| DOCUMENTARY/CULTURAL SHOWS | 2 | 1 | 2 | 5 | SMALL |
| THEATER/PERFORMANCE | 4 | 2 | 3 | 9 | MIDDLE |
| HOBBY/CULTURAL SHOWS | 2 | 2 | 3 | 7 | SMALL |
| WELFARE | 4 | 2 | 3 | 9 | MIDDLE |

(51) Int. Cl.
*H04N 11/04* (2006.01)
*H04N 9/804* (2006.01)
*H04N 5/21* (2006.01)
*H04N 5/445* (2011.01)
*H04N 21/433* (2011.01)
*H04N 21/44* (2011.01)
*H04N 21/84* (2011.01)
*H04N 19/117* (2014.01)
*H04N 19/137* (2014.01)
*H04N 19/176* (2014.01)
*H04N 19/86* (2014.01)
*H04N 19/61* (2014.01)
*H04N 19/136* (2014.01)
*H04N 19/82* (2014.01)
*H04N 19/182* (2014.01)
*H04N 19/46* (2014.01)
*H04N 5/85* (2006.01)

(56) References Cited

U.S. PATENT DOCUMENTS

| 2008/0279279 | A1* | 11/2008 | Liu et al. | 375/240.16 |
| 2009/0263032 | A1* | 10/2009 | Tanaka et al. | 382/233 |
| 2010/0246990 | A1* | 9/2010 | Lertrattanapanich et al. | 382/260 |

FOREIGN PATENT DOCUMENTS

| JP | 2001-238216 | 8/2001 |
| JP | 2003-244595 | 8/2003 |
| JP | 2006-222975 | 8/2006 |
| JP | 2008-060870 | 3/2008 |
| JP | 2008060870 A * | 3/2008 |
| JP | 2008-205534 | 9/2008 |
| JP | 2009-10603 | 1/2009 |
| JP | 2009-010603 | 1/2009 |
| JP | 2009-118080 | 5/2009 |
| JP | 2008-205534 | 9/2009 |
| WO | WO 2007/111292 | 4/2007 |

* cited by examiner

FIG. 4

| QP | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| α | 0 | 0 | 0 | 0 | 0 | 0 | 0 | 0 | 0 | 0 | 0 | 0 | 0 | 0 | 0 | 0 | 4 | 4 | 5 | 6 | 7 | 8 | 9 | 10 | 12 | 13 |
| β | 0 | 0 | 0 | 0 | 0 | 0 | 0 | 0 | 0 | 0 | 0 | 0 | 0 | 0 | 0 | 0 | 2 | 2 | 2 | 3 | 3 | 3 | 3 | 4 | 4 | 4 |

| QP | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6 | 6 | 7 | 7 | 8 | 8 | 8 | 9 | 10 | 10 | 11 | 11 | 12 | 12 | 13 | 13 | 14 | 14 | 15 | 15 | 16 | 16 | 17 | 17 | 18 | 18 |

FIG. 5

| NOISE PREFERENCE FACTORS | MOVING | INPUT | TEXTURE | TOTAL SCORE | FILTER STRENGTH PARAMETER |
|---|---|---|---|---|---|
| WEIGHT | (7) | (3) | (5) | | |
| NEWS/REPORTS | 4 | 2 | 3 | 9 | MIDDLE |
| SPORTS | 7 | 3 | 3 | 13 | LARGE |
| INFORMATION/WIDE SHOW | 4 | 2 | 3 | 9 | MIDDLE |
| DRAMAS | 4 | 2 | 3 | 9 | MIDDLE |
| MUSIC | 6 | 2 | 5 | 13 | LARGE |
| VARIETY SHOWS | 6 | 2 | 3 | 11 | LARGE |
| MOVIES | 4 | 2 | 3 | 9 | MIDDLE |
| ANIMATION/SPECIAL EFFECT SHOOTING | 4 | 2 | 3 | 9 | MIDDLE |
| DOCUMENTARY/CULTURAL SHOWS | 2 | 1 | 2 | 5 | SMALL |
| THEATER/PERFORMANCE | 4 | 2 | 3 | 9 | MIDDLE |
| HOBBY/CULTURAL SHOWS | 2 | 2 | 3 | 7 | SMALL |
| WELFARE | 4 | 2 | 3 | 9 | MIDDLE |

FIG. 6

| GENRE INFORMATION | FILTER STRENGTH PARAMETER |
|---|---|
| NEWS/REPORTS | FILTER STRENGTH PARAMETER: MIDDLE<br>slice_alpha_c0_offset_div2 = 0<br>slice_beta_dffset_div2 = 0 |
| SPORTS | FILTER STRENGTH PARAMETER: LARGE<br>slice_alpha_c0_offset_div2 = 6<br>slice_beta_dffset_div2 = 6 |
| INFORMATION/<br>WIDE SHOW | FILTER STRENGTH PARAMETER: MIDDLE<br>slice_alpha_c0_offset_div2 = 0<br>slice_beta_dffset_div2 = 0 |
| DRAMAS | FILTER STRENGTH PARAMETER: MIDDLE<br>slice_alpha_c0_offset_div2 = 0<br>slice_beta_dffset_div2 = 0 |
| MUSIC | FILTER STRENGTH PARAMETER: LARGE<br>slice_alpha_c0_offset_div2 = 6<br>slice_beta_dffset_div2 = 6 |
| VARIETY SHOWS | FILTER STRENGTH PARAMETER: LARGE<br>slice_alpha_c0_offset_div2 = 6<br>slice_beta_dffset_div2 = 6 |
| MOVIES | FILTER STRENGTH PARAMETER: MIDDLE<br>slice_alpha_c0_offset_div2 = 0<br>slice_beta_dffset_div2 = 0 |
| ANIMATION/SPECIAL<br>EFFECT SHOOTING | FILTER STRENGTH PARAMETER: MIDDLE<br>slice_alpha_c0_offset_div2 = 0<br>slice_beta_dffset_div2 = 0 |
| DOCUMENTARY/<br>CULTURAL SHOWS | FILTER STRENGTH PARAMETER: SMALL<br>slice_alpha_c0_offset_div2 = -6<br>slice_beta_dffset_div2 = -6 |
| THEATER/<br>PERFORMANCE | FILTER STRENGTH PARAMETER: MIDDLE<br>slice_alpha_c0_offset_div2 = 0<br>slice_beta_dffset_div2 = 0 |
| HOBBY/<br>CULTURAL SHOWS | FILTER STRENGTH PARAMETER: SMALL<br>slice_alpha_c0_offset_div2 = -6<br>slice_beta_dffset_div2 = -6 |
| WELFARE | FILTER STRENGTH PARAMETER: MIDDLE<br>slice_alpha_c0_offset_div2 = 0<br>slice_beta_dffset_div2 = 0 |

FIG. 8

| KINDS | | DETAILS | ADDITIVE INFORMATION | APPLICATION CONDITION |
|---|---|---|---|---|
| BROADCAST STATION INFORMATION | | H | 0.9 | |
| | | F | 1.1 | |
| CHARACTERISTIC KEYWORD | | LIVE BROADCAST | 1.2 | |
| | | SPORTS | 1.2 | GENRE INFORMATION DOES NOT OVERLAP |
| | | NAME OF NATURE | 0.8 | GENRE INFORMATION IS DOCUMENTARY/CULTURE |

FIG. 9

| LARGE CLASSIFICATION | EXCEPTIONAL MIDDLE CLASSIFICATION | MOVING (7) | INPUT (3) | TEXTURE (5) | TOTAL SCORE | FILTER STRENGTH PARAMETER |
|---|---|---|---|---|---|---|
| NEWS/REPORTS | POLITICS, CONGRESS/DISCUSSION, TALK | 1 | 2 | 2 | 5 | SMALL |
| INFORMATION/ WIDE SHOW | LIVING, HOME SHOWS/FOOD, COOKING/HEALTH, MEDICAL CARE | 1 | 2 | 2 | 5 | SMALL |
| MUSIC | CLASSIC, OPERA | 1 | 2 | 2 | 5 | SMALL |
| VARIETY SHOWS | TOUR, VARIETY | 1 | 2 | 1 | 4 | SMALL |
| MOVIES | ANIMATION | 4 | 2 | 5 | 11 | LARGE |
| ANIMATION/SPECIAL EFFECT SHOOTING | INTERNAL ANIMATION/INTERNATIONAL ANIMATION | 4 | 2 | 5 | 11 | LARGE |
| | SPECIAL EFFECT SHOOTING | 3 | 2 | 2 | 7 | SMALL |
| DOCUMENTARY/ CULTURAL SHOWS | SPORTS | 7 | 2 | 3 | 12 | LARGE |
| | HISTORY, TRAVEL/INTERVIEW, DISCUSSION | 1 | 2 | 3 | 6 | SMALL |
| THEATER/ PERFORMANCE | DANCE, BALLET | 7 | 2 | 3 | 12 | LARGE |
| | COMIC STORIES, DRAMATIC PERFORMANCES | 1 | 2 | 3 | 6 | SMALL |

IMAGE PROCESSING APPARATUS AND IMAGE PROCESSING METHOD

BACKGROUND OF THE INVENTION

1. Field of the Invention

The present invention relates to an image processing apparatus and an image processing method suitable for an encoding apparatus coding image data delivered by digital terrestrial broadcast, for example.

2. Description of the Related Art

There is widely known an image processing apparatus encoding broadcast program contents delivered by digital terrestrial broadcast and storing the broadcast program contents in a hard disk or an optical disk. Examples of the image processing apparatus include a hard disk recorder or a Blu-ray Disc (registered trademark) recorder.

In the digital terrestrial broadcast, the broadcast program contents viewed by viewers and information (hereinafter, referred to as EPG information) regarding the broadcast program contents are delivered. The EPG information contains the details or keywords of the broadcast program contents, a broadcast schedule, and genre information regarding the genre of the broadcast program contents.

There is known an image processing apparatus capable of again storing the stored broadcast program contents not reproduced for a certain period at a higher compression ratio (for example, see Japanese Unexamined Patent Application Publication No. 2009-10603). In this image processing apparatus, a compression ratio and time of increasing the compression ratio are configured to be selected depending on the genre information.

The genre information is classified in accordance with the details of the broadcast program contents. In some cases, the characteristics of image data may change depending on the details of the broadcast program contents. For this reason, it is considered that the image processing apparatus can make effective use of the genre information when encoding the image data.

It is desired to provide an image processing apparatus and an image processing method capable of improving an image quality.

SUMMARY OF THE INVENTION

According to an embodiment of the invention, there is provided an image processing apparatus including: a receiving unit which receives image data of program contents and genre information regarding the program contents; a determining unit which determines a characteristic parameter indicating characteristics of a filter filtering a local image obtainable by decoding encoding data, which is generated by encoding the image data received by the receiving unit, in accordance with the genre information received by the receiving unit; a characteristic changing unit which changes the characteristics of the filter in accordance with the characteristic parameter determined by the determining unit; and an encoding unit which generates the encoding data by encoding the image data received by the receiving unit by executing a prediction process by use of a local decoded image filtered in accordance with the characteristics of the filter changed by the characteristic changing unit.

With such a configuration, since the image processing apparatus can reflect the details of the program contents on the characteristics of the filter, it may be possible to appropriately set the characteristics of the filter.

According to an embodiment of the invention, there is provided an image processing method including the steps of: receiving image data of program contents and genre information regarding the program contents; determining a characteristic parameter indicating characteristics of a filter filtering a local image obtainable by decoding encoding data, which is generated by encoding the image data received in the receiving of the image data, in accordance with the genre information received in the receiving of the image data; changing the characteristics of the filter in accordance with the characteristic parameter determined in the determining of the characteristic parameter; and generating the encoding data by encoding the image data received in the receiving of the image data by executing a prediction process by use of a local decoded image filtered in accordance with the characteristics of the filter changed in the changing of the characteristics of the filter.

With such a configuration, since the image processing method can reflect the details of the program contents on the characteristics of the filter, it is possible to appropriately set the characteristics of the filter.

According to the embodiments of the invention, the details of the program contents can be reflected on the filter characteristics. Therefore, since the filter characteristics can be appropriately set, it is possible to realize the image processing apparatus and the image processing method capable of improving an image quality.

BRIEF DESCRIPTION OF THE DRAWINGS

FIG. 4 is a schematic diagram illustrating the definition of $\alpha$ and $\beta$.

FIG. 5 is a schematic diagram illustrating the determination of a filter strength parameter.

FIG. 6 is a schematic diagram illustrating the setting of an offset value.

FIG. 8 is a schematic diagram illustrating an additive coefficient table.

FIG. 9 is a schematic diagram illustrating exceptional filter strength parameters according to another embodiment.

DESCRIPTION OF THE PREFERRED EMBODIMENTS

Hereinafter, preferred embodiments of the invention will be described in detail with reference to the accompanying drawings. The description will be made in the following order.

1. First Embodiment (change in Filter Characteristics depending on Image Characteristics)
2. Second Embodiment (Use of Other Information)
3. Other Embodiments

1. First Embodiment

1-1. Configuration of Image Processing Apparatus

Figure 1:
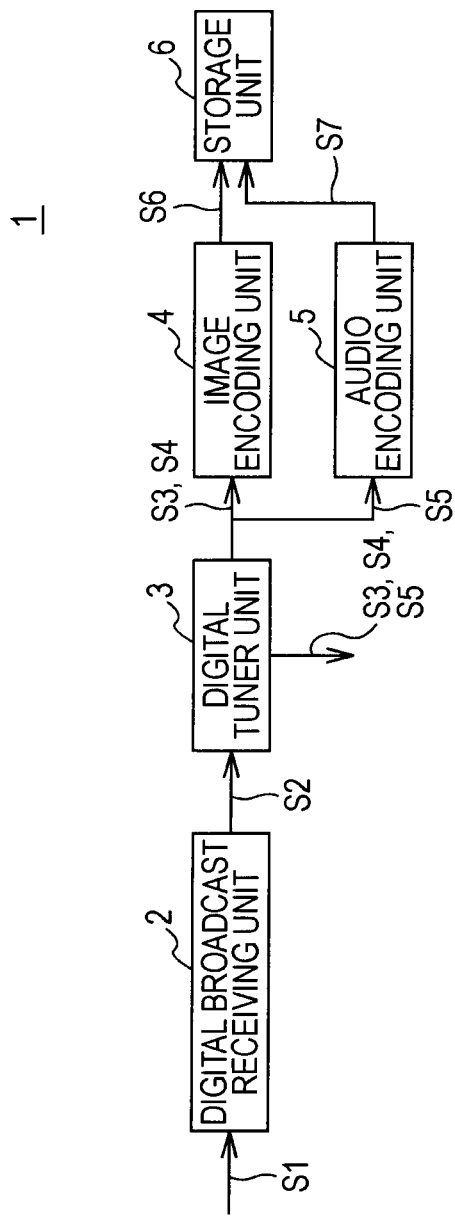
FIG. 1 is a schematic diagram illustrating the configuration of an image processing apparatus.

FIG. 1 is a diagram illustrating the overall configuration of an image processing apparatus. An image processing apparatus 1 includes a hard disk recorder and a personal computer capable of receiving and storing broadcast program contents as program contents.

A digital broadcast receiving unit 2 includes an external interface which is connected to an antenna or a network such as the Internet, for example, and receives a broadcast signal S1 such as digital terrestrial broadcast. The broadcast signal S1 is encoded in conformity with the standard MPEG (Moving Picture Experts Group) 2, for example.

When the digital broadcast receiving unit 2 receives the broadcast signal S1 that represents the broadcast program contents, the digital broadcast receiving unit 2 supplies the broadcast signal S1 as a broadcast signal S2 to a digital tuner unit 3. The digital tuner unit 3 decodes the broadcast signal S2 to generate EPG (Electric Program Guide) information S3, image data S4, and audio data S5, and then supplies the EGP information S3, the image data S4, and the audio data S5 to a display apparatus (not shown) such as a television apparatus. The EPG information contains the details or keywords of the broadcast program contents, a broadcast schedule, broadcast station information, temporal information, and genre information.

As a consequence, images based on the image data S4 are displayed and sound based on the audio data S5 are output. Moreover, various kinds of information of the EPG information are displayed in response to the request of a user.

The digital tuner unit 3 supplies the EPG information S3 and the image data S4 to an image encoding unit 4 and supplies the audio data S5 to an audio encoding unit 5. The image encoding unit 4 encodes the image data S4 in conformity with the H.264/AVC (Advanced Video Coding) method to generate a bit stream S6 by an image encoding process, which is described below, and then supplies the bit stream S6 to the storage unit 6.

The audio encoding unit 5 encodes the audio data S5 by a predetermined encoding method to generate audio encoding data S7 and supplies the audio encoding data to the storage unit 6. The storage unit 6 includes a hard disk, an optical disk driver such as Blu-ray Disc (registered trademark), and a flash memory. The storage unit 6 stores the bit stream S6 and the audio encoding data S7 in correspondence to each other.

As a consequence, the broadcast program contents are stored in an encoded state in the storage unit 6. The image processing apparatus 1 reads the broadcast program contents stored in the storage unit 6 in response to the request of a user, decodes the broadcast program contents by a decoding unit (not shown), and reproduces the image data S4 and the audio data S5. The decoding unit supplies the image data S4 and the audio data S5 to the display apparatus. As a consequence, the images based on the image data S4 are displayed and the sound based on the audio data S5 are output in the display apparatus.

1-2. Configuration of Image Encoding Unit

Figure 2:
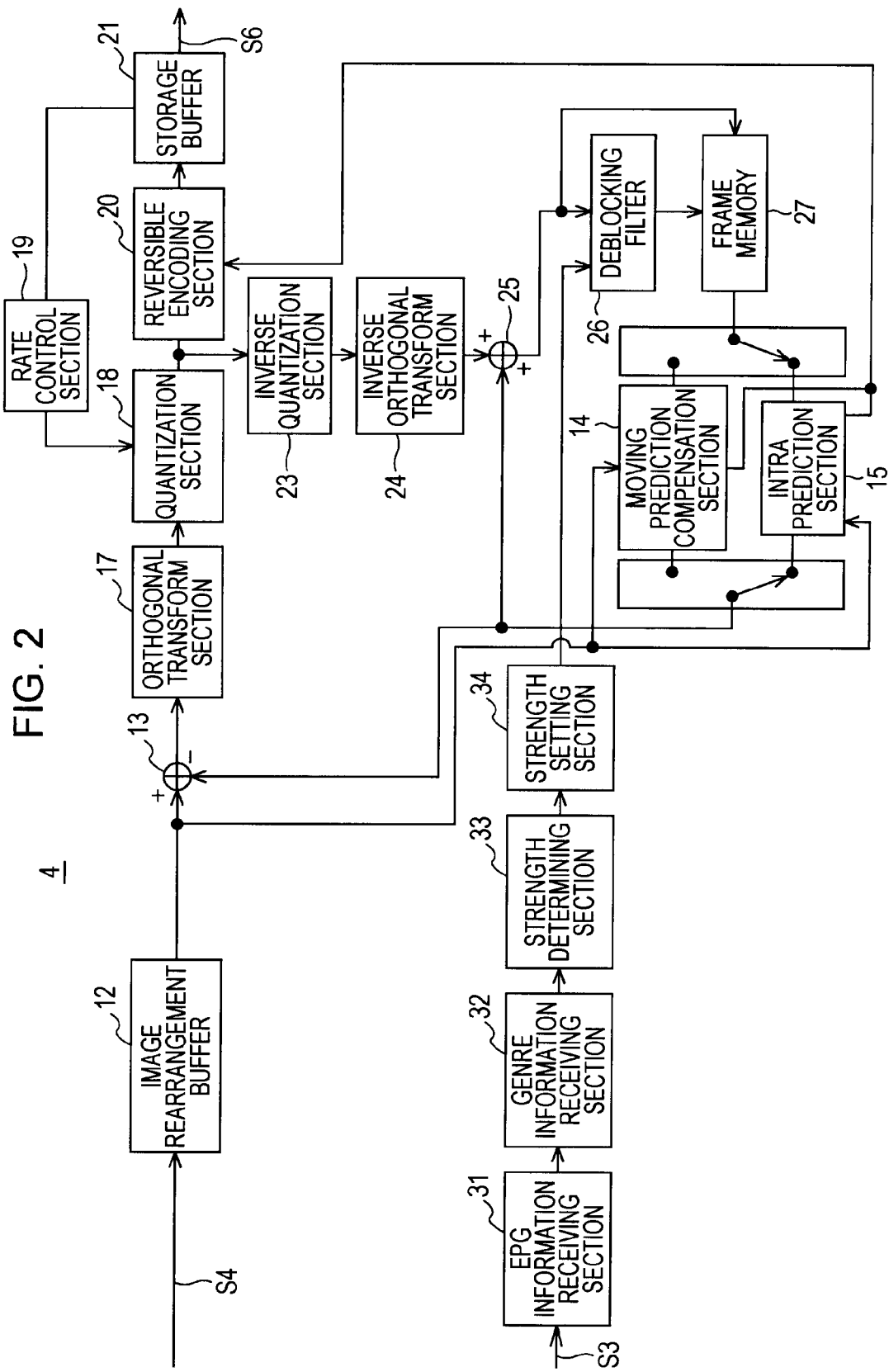
FIG. 2 is a schematic diagram illustrating the configuration of an image encoding unit.

As shown in FIG. 2, the image encoding unit 4 supplies the EPG information S3 and the image data S4 to an EPG information receiving section 31 and a picture rearrangement buffer 12, respectively, when the EPG information S3 and the image data S4 are supplied from the digital tuner unit 3.

The picture rearrangement buffer 12 rearranges the image data S4 in conformity with the structure of GOP (Group Of Picture) in a case of the image data S4 and supplies the rearranged image data S4 to an calculation section 13, a moving prediction compensation section 14, an intra prediction section 15, and a calculation section 25.

The calculation section 13 subtracts a prediction value L5 supplied from the moving prediction compensation section 14 from the image data S4 and supplies the subtraction result as differential data D1 to an orthogonal transform section 17, when the image data S4 is inter-encoded. The calculation section 13 subtracts the prediction value L5 supplied from the intra prediction section 15 from the image data S4 and supplies the subtraction result as the differential data D1 to the orthogonal transform section 17, when the image data S4 is intra-encoded.

The orthogonal transform section 17 executes orthogonal transform, such as the DCT (Discrete Cosine Transform) transform or the Karhunen-Loeve transform, on the differential data D1 and supplies an orthogonal transform coefficient D2 to a quantization section 18.

The quantization section 18 quantizes the orthogonal transform coefficient D2 by using a quantization parameter QP determined by the control of a rate control section 19 and supplies a quantization coefficient D3 to an inverse quantization section 23 and a reversible encoding section 20. The reversible encoding section 20 executes reversible encoding on the quantization coefficient D3 in accordance with an entropy coding method such as CAVLC (Context-based Adaptive variable Length Code) or CABAC (Context Adaptive Binary Arithmetic Coding) and supplies reversible encoding data D5 to a storage buffer 21.

The reversible encoding section 20 sets information regarding intra encoding and inter encoding and information acquired from the moving prediction compensation section 14 and the intra prediction section 15 to header information of the reversible encoding data D5.

The storage buffer 21 stores the reversible encoding data D5 and outputs the reversible encoding data D5 as a bit stream S6 at a predetermined transmission rate. The rate control section 19 monitors the storage buffer 21 and determines the quantization parameter QP so that a generation code amount of the reversible encoding data D5 is close to a certain code amount of each predetermined control unit (for example, a frame or the GOP).

The inverse quantization section 23 executes inverse quantization of the quantization coefficient D3 to generate a reproduction orthogonal transform coefficient L1 and supplies the reproduction orthogonal transform coefficient L1 to an inverse orthogonal transform section 24. The inverse orthogonal transform section 24 executes inverse orthogonal transform of the reproduction orthogonal transform coefficient L1 to generate a reproduction differential data L2 and supplies the reproduction differential data L2 to the calculation section 25.

The calculation section 25 adds the reproduction differential data L2 to the prediction value L5 supplied from the moving prediction compensation section 14 or the intra prediction section 15 to generate a local decoded image L3 of a processing target block, and supplies the local decoded image L3 to a deblocking filter 26 and a frame memory 27.

The deblocking filter 26 executes a deblocking filter process on a processing target block and supplies the result to the frame memory 27. As a consequence, the local decoded images L4 subjected to the deblocking filter process are stored in the frame memory 27.

The frame memory 27 supplies the local decoded image L4 corresponding to a reference target block among the local decoded images L4 subjected to the deblocking filter process to the moving prediction compensation section 14 or the intra prediction section 15. The moving prediction compensation section 14 generates the prediction value L5 of the processing target block by making moving prediction about the image data S4 with reference to the local decoded image L4, and supplies the prediction value L5 to the calculation sections 13 and 25. The intra prediction section 15 generates the prediction value L5 of the processing target block by making the intra prediction about the image data S4 with reference to the local decoded image L4, and supplies the prediction value L5 to the calculation sections 13 and 25.

In this way, the image encoding unit 4 encodes the image data S4 to generate the bit stream S6.

1-3. Deblocking Filter Process

Next, a deblocking filter process performed by the deblocking filter 26 will be described.

The image encoding unit 4 executes the above-described encoding process on each processing unit block formed by a predetermined pixel number. The processing unit block is basically a macro block having 16×16 pixels, but the size of the processing unit block depends on processed contents. For example, the orthogonal transform section 17 executes a DCT process on every DCT block having 4×4 pixels or 8×8 pixels. The quantization section 18 executes a quantization process by using the quantization parameter QP set in each macro block.

For this reason, distortion between the blocks (hereinafter, referred to as block distortion) may occur in the local decoded image L3 generated by the inverse orthogonal transform section 24 in some cases. The image encoding unit 4 may propagate deterioration in an image quality, when the image encoding unit 4 generates the prediction value L5 with reference to the local decoded image L3 containing the block distortion.

Therefore, the image encoding unit 4 executes the deblocking filter process to eliminate the block distortion, generates the local decoded image L4, and then generates the prediction value L5 with reference to the local decoded image L4. As a consequence, the image encoding unit 4 rarely propagates the deterioration in the image quality caused in the encoding.

The deblocking filter process causes deterioration in the resolution of an image, but reduces the block distortion. For this reason, the image encoding unit 4 selectively puts the deblocking filter on a region where the block distortion easily occurs.

Figure 3:
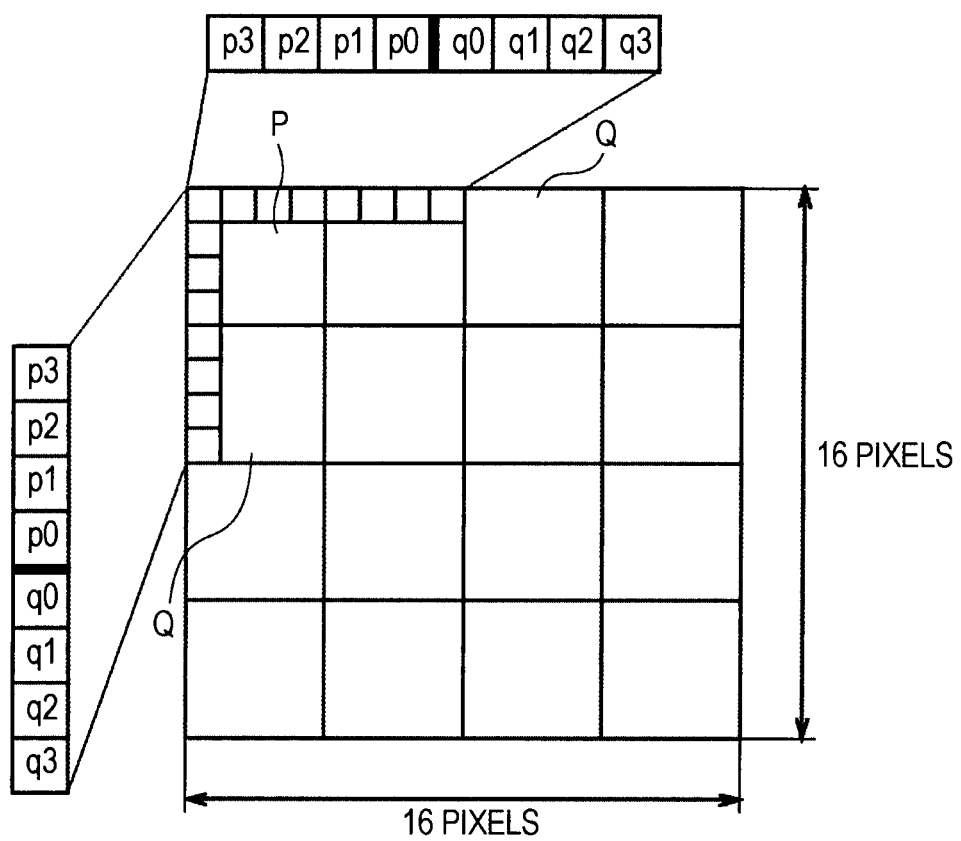
FIG. 3 is a schematic diagram illustrating a filter block and a macro block.

As shown in FIG. 3, the block having 4×4 pixels, which is a processing target, is referred to as a filter block P. A block adjacent to the right or lower side of the filter block P is referred to as an adjacent block Q. The boundary between the filter block P and the adjacent block Q is referred to as a block boundary (indicated by a heavy line). Pixels adjacent to the block boundary are referred to as p0 and q0. The pixels of the filter block are referred to as p1, p2, and p3 in a direction in which the pixels are distant from the block boundary. The pixels of the adjacent block Q are referred to as q1, q2, and q3 in the same way. The boundary between the macro blocks is referred to as a macro block boundary.

The deblocking filter 26 determines the strength Bs of the block boundary in accordance with the position of the filter block P from the block boundary in the macro block, whether the filter block P is the intra block, and a reference picture and a moving vector value in the inter encoding. The strength Bs of the block boundary is evaluated in five stages of "0" to "4".

The deblocking filter 26 puts the deblocking filter on the block boundary, when Expressions 1 to 4 are all satisfied. On the contrary, the deblocking filter 26 does not put the deblocking filter on the block boundary, when any of Expressions 1 to 4 is not satisfied.

Expression 1

$$Bs>0 \qquad (1)$$

Expression 2

$$|p0-q0|<\alpha \qquad (2)$$

Expression 3

$$|p1-p0|<\beta \qquad (3)$$

Expression 4

$$|q1-q0|<\beta \qquad (4)$$

That is, the deblocking filter 26 evaluates the strength Bs of the block boundary to "0", when the filter block P and the adjacent block Q are the inter blocks and has almost the same design as that of the reference picture. At this time, the deblocking filter 26 does not put the deblocking filter on the block boundary.

The deblocking filter 26 puts the deblocking filter on the block boundary, only when the strength Bs of the block boundary is "1" or more and the following conditions 1) to 3) are all satisfied:

1) a difference between pixel values p0 and q0 adjacent to the block boundary is smaller than an index $\alpha$;

2) a difference between the pixel value p0 and a pixel value p1 adjacent to the pixel value p0 is smaller than an index $\beta$; and 3) a difference between the pixel value q0 and a pixel value q1 adjacent to the pixel value q0 is smaller than the index $\beta$.

Here, FIG. 4 shows the list of the indexes $\alpha$ and $\beta$. As shown in FIG. 4, the indexes $\alpha$ and $\beta$ are set in correspondence with the values of the quantization parameter QP. As the values of the quantization parameter QP increase, the values of the indexes $\alpha$ and $\beta$ increase.

In other words, the deblocking filter 26 does not put the deblocking filter on the block boundary, when the quantization parameter QP is smaller (equal to or less than "15"). This is because the block distortion rarely occurs.

The deblocking filter 26 determines whether to put the deblocking filter in accordance with a difference between the pixel values, when the quantization parameter QP is large (equal to or more than "16").

When the deblocking filter is put in the case where the difference between the pixel values is large, a resolution may considerably deteriorate. The deblocking filter 26 prioritizes maintaining the resolution rather than to reduce the block distortion, when the quantization parameter QP is relatively small, the occurrence possibility of the block distortion is small, and the occurrence degree of the block distortion is small even when the block distortion occurs.

The deblocking filter 26 applies the deblocking filter, only when the difference between the pixel values is further smaller than the indexes $\alpha$ and $\beta$ with a small value. That is, when the quantization parameter QP is relatively small, the deblocking filter 26 applies the deblocking filter on the block boundary only in a case of maintaining the resolution. For this reason, the strength of the deblocking filter becomes small.

When the quantization parameter QP is large, the occurrence possibility of the block distortion is large and the occurrence degree of the block distortion is large, thereby showing up the block distortion. The deblocking filter 26 prioritizes reducing a noise rather than to maintain the resolution, when the quantization parameter QP is relatively large.

The deblocking filter 26 applies the deblocking filter, when the difference between the pixel values is smaller than the indexes $\alpha$ and $\beta$ with a large value. That is, the deblocking filter 26 is highly likely to apply the deblocking filter on the block boundary, when the quantization parameter QP is relatively large. For this reason, the strength of the deblocking filter becomes large.

That is, the deblocking filter 26 determines the indexes $\alpha$ and $\beta$ so as to prioritize reducing a noise rather than to maintain the resolution with an increase in the value of the quantization parameter QP, by comparing the occurrence possibility of the block distortion and the reduction in the resolution.

For example, the deblocking filter 26 selects "25" and "8" as the indexes $\alpha$ and $\beta$, respectively, when the quantization parameter QP is "30". The deblocking filter 26 determines whether to apply the deblocking filter on the block boundary by using the indexes $\alpha$ and $\beta$ with reference to Expression 1 to 4.

The standard of H.264/AVC describes that an offset (hereinafter, referred to as a QP offset) can be added to the quantization parameter QP, when the indexes $\alpha$ and $\beta$ are selected. In this way, it is possible to change prioritization between the reduction in the block distortion and the reduction in the resolution.

However, the broadcast program contents supply image data with various images and image qualities. For example, in the broadcast program contents introducing natures, historic buildings, and the like, the image quality is a very important factor and thus it is prioritized to maintain the resolution. Alternatively, in the broadcast program such as sports, the resolution is not the important factor and thus it is prioritized to first remove a noise.

In the digital terrestrial broadcast, the EPG information is delivered as well as the broadcast program contents. The EPG information contains genre information classified in accordance with the details of the broadcast program contents, as well as broadcast schedule information or the details of the broadcast program contents.

The image encoding unit 4 according to this embodiment changes the prioritization between the reduction in the block distortion and the maintenance of the resolution depending on the details of the broadcast program contents, by selecting the QP offset in accordance with the genre information.

1-4. Setting of Filter Characteristics

Next, there will be described a filter-characteristic setting process to set the strength of the deblocking filter 26 in accordance with the genre information.

In the broadcast program contents having images of which moving is active, the resolution is not important due to the fact that users mainly view the moving. Therefore, in a genre to which the broadcast program contents having images of which moving is active belong, the reduction in the noise has to be prioritized over the maintenance of the resolution. On the contrary, in the broadcast program contents having images of which moving is small, the entire image is an important factor and thus the maintenance of the resolution has to be prioritized due to the fact that users do not mainly view a particular image.

In the digital terrestrial broadcast, as described above, the image data encoded by an encoding method such as MPEG-2 are delivered. In particular, in live broadcast, since the broadcast program contents are delivered in real time, the resolution of the broadcast program content is generally low. Therefore, at an input stage, the block distortion may already arise in some cases. In genre to which the broadcast program contents having the low-quality image data S4 belong, the reduction in the noise is prioritized over the maintenance of the resolution.

On the other hand, in the broadcast program contents introducing natures, historic buildings, and the like, high-quality images photographed by an apparatus capable of taking high quality picture are delivered. Therefore, in a genre to which the broadcast program contents having the high-quality image data S4 belong, the maintenance of the resolution has to be prioritized over the reduction in the noise.

In the broadcast program contents introducing music, a scene in which a singer sings a song is a very important factor. In this scene, since viewers mainly view the expression of the singer, the viewers may even notice small block distortion. Therefore, in a genre to which the broadcast program contents having texture in the important scenes of which the viewers mainly view an area belong, the reduction of a noise has to be prioritized over the maintenance of the resolution.

In this embodiment, the prioritization is evaluated for the reduction in the noise and the maintenance of the resolution in accordance with the visual features of the image data S4 of each genre of the broadcast program contents. According to the prioritization, the strength of the deblocking filter 26 is adjusted.

FIG. 5 is a diagram illustrating a list of the genre information and filter strength parameters corresponding to the genre information. In the digital terrestrial broadcast, the broadcast program contents are classified into twelve genres (so-called large classification). In this embodiment, according to the above-described rule, noise prioritization factors indicating the prioritization of the reduction in the noise are scored. The strength of the filter in the deblocking filter process is determined depending on the total points. In this embodiment, examples of the noise prioritization factors include "moving", "input", and "texture".

In the genre to which the broadcast program contents having images of which moving is active belong, the reduction in the noise has to be prioritized. Therefore, the score is increased. The "input" is the noise prioritization factor indicating the quality of the input image data S4. When the quality is low, the reduction in the noise has to be prioritized. Therefore, the score is increased. The "texture" is the noise prioritization factor indicating an image with an area which viewers mainly view. The reduction in the noise has to be referred. Therefore, the score is increased.

The highest scores (shown in parentheses) of the noise prioritization factors are different from each other. That is, the noise prioritization factors are weighted in accordance with the importance.

The high total score obtained by adding the values of the respective noise prioritization factors means that the reduction in the noise is prioritized over the maintenance of the resolution and thus the strength of the filter is set to be large. On the contrary, the low total score means that the maintenance of the resolution is prioritized over the reduction in the noise and the strength of the filter is set to be low.

In this embodiment, the total score of "9" is a middle value. When the total score is in the range from "8" to "10", the filter strength parameter is set to "middle". When the total score is "11" or more, the filter strength parameter is set to "large". When the total score is "7" or less, the filter strength parameter is set to "small".

Specifically, in news/reports, the "moving" is evaluated to "4" as a middle value, since images, such as sports, of which moving is active and images close to still images delivered when a reporter delivers news are included. In the news/reports, the "input" is evaluated to "2" as a middle value, since there are various qualities of the image data S4 from pre-recorded images to live broadcast images. In the news/reports, the "texture" is also evaluated to "3" as a middle value due the same reason. As a consequence, the total score is "9". Therefore, the filter strength parameter is set to "middle".

In sports, the "moving" is evaluated to "7" as the largest value, since the moving is quite active. In sports, the "input" is evaluated to "3" as the largest value and the "texture" is evaluated to "2" as a middle value, since sports are mainly broadcasted in real time. As a consequence, the total score is "13" and thus the filter strength parameter is set to "large".

In information/wide shows, the "moving", the "input", and the "texture" are evaluated to "4", "2", and "3" as middle values, since the various kinds of image data S4 are input, as in the news/reports. As a consequence, the total score is "9" and thus the filter strength parameter is set to "middle".

In dramas, there are various dramas, such as romance dramas, of which moving is not active and dramas, such as action dramas and sports dramas. Therefore, in the dramas, the "moving", the "input", and the "texture" are evaluated to "4", "2", and "3" as the middle values, as in the news/reports. As a consequence, the total score is "9" and thus the filter strength parameter is set to "middle".

In music, the "moving" is relatively active due to camera work or flash illumination and thus is evaluated to "6". The "texture" is evaluated to "5" due to the scenes in which a singer sings a song. The "input" is evaluated to "2" as a middle value. As a consequence, the total score is "13" and thus the filter strength parameter is set to the "large".

In variety shows, the "moving" is evaluated to "6", since the moving of performers is relatively active in action games and there is also great camera work. In the variety shows, the "input" and the "texture" are evaluated to "2" and "3" as middle values. As a consequence, the total score is "11" and thus the filter strength parameter is set to "large".

In movies, there are various movies, such as romance movies, of which the moving is not active and movies, such as action movies and sports movies, of which the moving is active, as in the dramas. Therefore, in the movies, the "moving", the "input", and the "texture" are evaluated to "4", "2", and "3", respectively, as the middle values as in the news/reports and dramas. As a consequence, the total score is "9" and thus the filter strength parameter is set to "middle".

Animation/special effect shooting is a combination form of an animation and a special effect shooting. Animation is mainly formed by line images of which color tones are rapidly changed and has a feature in which the block distortion is easily noticed. However, the special effect shooting is live action. Since camera work is not great, moving is not active and thus special effect shooting has a feature different from that of animation. Therefore, in animation/special effect shooting, the "moving", the "input", and the "texture" are evaluated to "4", "2", and "3", respectively, as the middle values as in the news/reports and dramas. As a consequence, the total score is "9" and thus the filter strength parameter is set to the "middle".

In documentary/cultural shows, since scenery is mainly photographed rather than performers, moving is not active. The "moving" is evaluated to "2". Since the impact of the resolution is large, the "texture" is evaluated to "2". In documentary/cultural shows, a program is photographed by an apparatus capable of taking high quality pictures and is processed carefully. Since the image data S4 generally has a high resolution, the "input" is evaluated to "1". As a consequence, the total score is "5" and thus the filter strength parameter is set to "small".

In theater/performance, there are numerous programs, such as comedy stories, of which moving is not active and programs, such as dance and ballet, of which moving is active and camera work is large. Therefore, in the theater/performance, the "moving", the "input", and the "texture" are evaluated to "4", "2", and "3", respectively, as the middle values as in the news/reports and dramas. As a consequence, the total score is "9" and thus the filter strength parameter is set to the "middle".

In hobby/cultural shows, there are numerous programs, such as a program introducing how to do gardening or to play Japanese chess and there are numerous still pictures to give an explanation. Therefore, in the hobby/cultural shows, the "moving" is evaluated to "2" and "input" and the "texture" are evaluated to "2" and "3" as the middle values, respectively. As a consequence, the total score is "9" and thus the filter strength parameter is set to the "middle".

In welfare, there are various programs including a program introducing a welfare problem, of which moving is not active and a program, such as a historical play including text broadcasting, of which moving is active. Therefore, in welfare, the "moving", the "input", and the "texture" are evaluated to "4", "2", and "3", respectively, as the middle values as in the news/reports and dramas. As a consequence, the total score is "9" and thus the filter strength parameter is set to the "middle".

Specifically, when the EPG information receiving section 31 (see FIG. 2) of the image encoding unit 4 receives the EPG information S3 supplied from the digital tuner unit 3 (see FIG. 1), the EPG information receiving section 31 supplies the EPG information S3 to a genre information receiving section 32. The genre information receiving section 32 extracts genre information corresponding to the broadcast program contents, which are a recording target, from the EPG information S3, and supplies the genre information to a strength determining section 33.

The strength determining section 33 stores a setting table made by corresponding to the filter strength parameters and the genre information. When the strength determining section 33 selects the filter strength parameter corresponding to the genre information, the strength determining section 33 supplies the filter strength parameter to a strength setting section 34.

The strength setting section 34 adds the QP offset to the value of the quantization parameter QP used in the quantization process in accordance with the filter strength parameter supplied from the strength determining section 33. That is, the strength setting section 34 changes the values of slice_alpha_c0_offset_div2 and slice_beta_offset_div2 contained in the slice header of the local decoded image L3 in accordance with the filter strength parameter.

As shown in FIG. 6, the strength setting section 34 sets the values of slice_alpha_c0_offset_div2 and slice_beta_offset_div2 to "6", when the filter strength parameter is "large". At this time, when the value of the quantization parameter QP used in the quantization process is "30", for example, the deblocking filter 26 assumes the value of the quantization parameter QP to be "33" given by offsetting the value of the quantization parameter QP at the time of selecting the indexes α and β only by 6/2.

The deblocking filter 26 selects the index α="36" and the index β="9" in accordance with the quantization parameter QP="33", as shown in FIG. 4. As a consequence, the deblocking filter 26 can execute the deblocking filter process at the same strength of the filter as the quantization parameter QP="33", that is, the strength of the filter larger than the quantization parameter QP used in the actual quantization process.

The strength setting section 34 sets the values of slice_alpha_c0_offset_div2 and slice_beta_offset_div2 to "0", when the filter strength parameter is "middle". At this time, since the QP offset is not added, the deblocking filter 26 can execute the deblocking filter process at the same strength of the filter as the quantization parameter QP used in the actual quantization process.

The strength setting section 34 sets the values of slice_alpha_c0_offset_div2 and slice_beta_offset_div2 to "−6", when the filter strength parameter is "small". At this time, when the value of the quantization parameter QP used in the quantization process is "30", for example, the deblocking filter 26 assumes the value of the quantization parameter QP to be "27" given by offsetting the value of the quantization parameter QP at the time of selecting the indexes $\alpha$ and $\beta$ only by 6/2.

The deblocking filter 26 selects the index $\alpha$="17" and the index $\beta$="6" in accordance with the quantization parameter QP="27". As a consequence, the deblocking filter 26 can execute the deblocking filter process at the same strength of the filter as the quantization parameter QP="27", that is, the strength of the filter smaller than the quantization parameter QP used in the actual quantization process.

In this way, the image encoding unit 4 evaluates the noise prioritization factors indicating the prioritization of the reduction in the noise in accordance with the visual features of the image data S4 different depending on each genre of the broadcast program contents. The image encoding unit 4 adjusts the strength of the deblocking filter 26 depending on the evaluation of the noise prioritization factors.

The image encoding unit 4 can change the strength of the deblocking filter 26 in accordance with the visual features of the image data S4. Therefore, since the image encoding unit 4 sets the strength of the filter suitable for the image data S4, the image encoding unit 4 can improve the quality of the local decoded image L4. As a consequence, since the image encoding unit 4 encodes the image data S4 with reference to the good quality local decoded image, the image encoding unit 4 can improve the image quality of the bit stream S6.

The above-described series of the encoding process and the filter-characteristic setting process can be executed by either hardware or software. When the encoding process and the filter-characteristic setting process are executed by software, the image encoding unit 4 is realized virtually in the CPU and the RAM. Then, an encoding process program and a filter-characteristic setting process program stored in the ROM are developed in the RAM to execute the encoding process and the filter-characteristic setting process.

1-5. Sequence of Filter-Characteristic Setting Process

Figure 7:
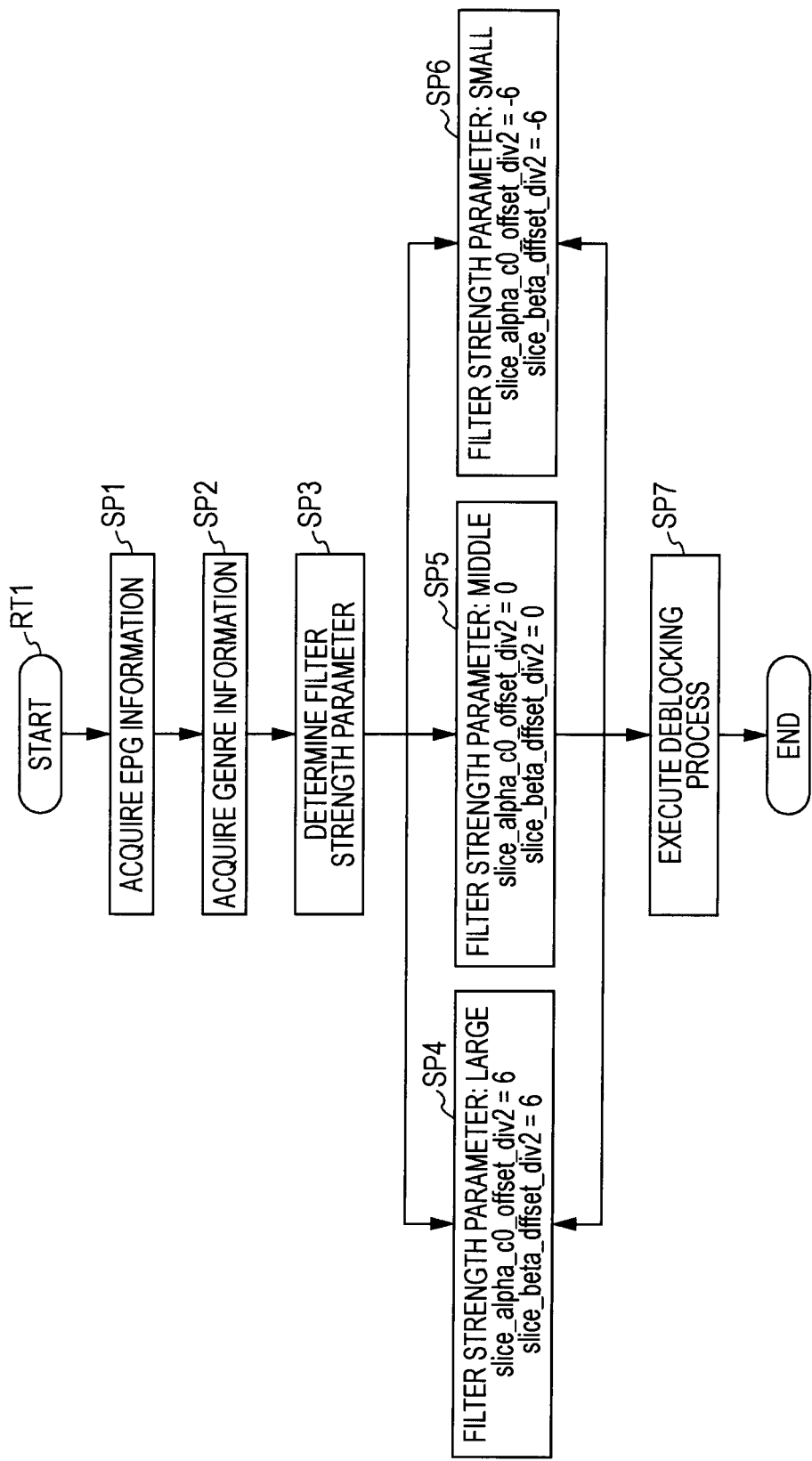
FIG. 7 is a schematic diagram illustrating a setting sequence of filter characteristics.

Next, with reference to a flowchart of FIG. 7, will be described a sequence RT1 of the filter-characteristic setting process executed in accordance with the filter-characteristic setting process program.

The image encoding unit 4 starts the sequence RT1 of the filter-characteristic setting process. In step SP1, when the EPG information S3 and the image data S4 are supplied, the process proceeds to the subsequent step SP2.

In step SP2, when the image encoding unit 4 acquires the genre information from the EPG information, the process proceeds to the subsequent step SP3.

In step SP3, the image encoding unit 4 determines the filter strength parameter corresponding to the genre information. At this time, when the image encoding unit 4 determines that the filter strength parameter is "large", the process proceeds to step SP4. Alternatively, when the image encoding unit 4 determines that the filter strength parameter is "middle", the process proceeds to step SP5. Alternatively, when the image encoding unit 4 determines that the filter strength parameter is "small", the process proceeds to step SP6.

In step SP4, the image encoding unit 4 increases the strength of the filter and prioritizes reducing the noise. Therefore, when the values of slice_alpha_c0_offset_div2 and slice_beta_offset_div2 are each set to "6", the process proceeds to the subsequent step SP7.

In step SP5, the image encoding unit 4 maintains the standard strength of the filter. Therefore, when the values of slice_alpha_c0_offset_div2 and slice_beta_offset_div2 are each set to "0", the process proceeds to the subsequent step SP7.

In step SP6, the image encoding unit 4 decreases the strength of the filter and maintains the resolution. Therefore, when the values of slice_alpha_c0_offset_div2 and slice_beta_offset_div2 are each set to "6", the process proceeds to the subsequent step SP7.

In step SP7, when the image encoding unit 4 executes the deblocking filter process at the strength of the filter set in steps SP4 to SP6, the process proceeds to the end step to end the process.

1-6. Operation and Advantage

With the above-described configuration, the image encoding unit 4 of the image processing apparatus 1 receives the image data S4 of the broadcast program contents and the genre information regarding the broadcast program contents which are the program contents supplied from the digital tuner unit 3. The image encoding unit 4 determines the filter strength parameter as the characteristic parameter indicating the characteristics of the filter (the deblocking filter 26) filtering the local decoded image L3 obtained by executing the local decoding on the quantization coefficient D3 encoded in accordance with the genre information. The image encoding unit 4 changes the characteristics (the strength of the filter) of the filter in accordance with the determined filter strength parameter.

The image encoding unit 4 encodes the image data by executing a prediction process (an inside picture prediction and a moving prediction) using the filtered local decoded image L4. At this time, the image encoding unit 4 decodes the quantization coefficient D3, which is the encoded image data, to generate the local decoded image L3. The image encoding unit 4 executes the deblocking filter process as a process of filtering the generated local decoded image L3 to generate the local decoded image L4.

In this way, the image encoding unit 4 can reflect the details of the broadcast program contents indicated by the genre information on the strength of the filter. That is, the image encoding unit 4 can execute the deblocking filter process at appropriate strength of the filter in accordance with the details of the broadcast program contents that are not grasped even upon analyzing the image data S4. As a consequence, in contrast to an existing method, the image encoding unit 4 can set the appropriate strength of the filter, and thus can maintain balance between the resolution and the noise.

The image encoding unit 4 determines the strength of the filter in accordance with the visual feature of the image data S4 indicated by the genre information. That is, the image encoding unit 4 determines the balance between the reduction in the resolution and the reduction in the noise for the strength of the filter in consideration of the fact that viewers view a lot of images in accordance with the details of the broadcast program contents.

In this way, the image encoding unit 4 can improve the image quality since the viewers may not notice the deterioration in the deblocking or the reduction in the resolution.

The image encoding unit 4 considers that the reduction in the resolution may be allowed when the moving of the images is active. This is because the viewers are absorbed in the moving of the image and thus the viewers may not notice the reduction in the resolution. Therefore, the image encoding unit 4 prioritizes reducing the noise of the broadcast program contents, in which the moving of the images is active, and increases the strength of the filter. On the contrary, when the moving of the images is not active, the viewers view a few of images, and thus the reduction in the resolution is a problem. Therefore, the image encoding unit 4 prioritizes maintaining the resolution of the broadcast program contents and decreases the strength of the filter.

The image encoding unit 4 considers the possibility that the noise may be noticed, when the quality of the input image data S4 is low. Therefore, the image encoding unit 4 prioritizes reducing the noise of the broadcast program contents of the genre with a low quality and increases the strength of the filter. On the contrary, when the quality of the image data S4 is high, the original images are produced with a high resolution and thus the noise is low. The image encoding unit 4 prioritizes maintaining the resolution of the broadcast program contents of the genre with a high quality and decreases the strength of the filter.

When the expression of a person is an important factor, the image encoding unit 4 focuses on the high possibility that the viewers may notice slight noise since the viewers mainly view the face of the person. Therefore, the image encoding unit 4 prioritizes reducing the noise of the broadcast program contents in which the viewers mainly view a particular area, and increases the strength of the filter. On the contrary, when the presence of a person is not an important factor, there is a small possibility that the viewers focus on a particular area. The image encoding unit 4 prioritizes maintaining maintain the resolution of the broadcast program contents in which the viewers mainly view the particular area, and decreases the strength of the filter.

In this way, the image encoding unit 4 can reflect the moving or the filtering degree of the details of the broadcast contents focused by the viewers on the strength of the filter. As a consequence, the image encoding unit 4 can set the strength of the filter more appropriately, compared to an existing method in which the strength of the filter is determined only in accordance with the characteristics of the pixels of the image data S4.

The image encoding unit 4 determines the filter strength parameter so as to increase the strength of the filter, when the genre information indicates sports.

In this way, the image encoding unit 4 prioritizes reducing the noise of the broadcast program contents of which the input image data S4 has a low image quality and of which the moving is active. In the broadcast program contents of which the moving is active, the noise easily occurs. The image encoding unit 4 prioritizes reducing the noise, thereby effectively reducing the noise.

The image encoding unit 4 determines the filter strength parameter so as to increase the strength of the filter, when the genre information indicates music.

In the broadcast program contents of which genre information is music, a scene in which a singer sings a song is an important factor. In this scene, electric lights are used as background or a flash is used. Moreover, camera work is great and thus the moving is relatively active. For this reason, it is difficult for the viewers to notice the deterioration in the resolution. Moreover, since the expression of the singer is an important factor and the viewers mainly view the facial area of the singer, it is easy for the viewers to notice the small noise and the area where the viewers feel dissatisfaction becomes larger than other areas. This is because it is assumed that the viewers may feel the discomfort when the viewers notice the noise present in the facial area of a singer who the viewers like.

Since the image encoding unit 4 prioritizes reducing the noise, it is possible to nearly remove the noise from the facial area of the signer and thus the viewers may rarely feel dissatisfied.

The image encoding unit 4 determines the filter strength parameter so as to increase the strength of the filter, when the genre information indicates variety shows.

In this way, the image encoding unit 4 can prioritize reducing the noise of the broadcast program contents of which the moving is active.

The image encoding unit 4 determines the characteristic parameter so as to decrease the strength of the filter, when the genre information indicates documentary/cultural shows.

In this way, the image encoding unit 4 can prioritizes maintaining the resolution of the broadcast program contents of which the moving is small and of which the input image data S4 has a high image quality. That is, it is possible to suppress the resolution of the broadcast program contents delivered with high resolution from deteriorating.

The image encoding unit 4 encodes the image data S4 with reference to the local decoded image L4 produced by decoding the encoded image data. The deblocking filter 26 executes the deblocking filter process on the local decoded image L3 to generate the local decoded image L4.

In this way, the image encoding unit 4 can refer to the local decoded image L3 of which the noise is reduced. Therefore, it is possible to suppress the noise occurring in the encoding process from propagating the subsequently encoded images.

As for the filter strength parameter, it is evaluated whether the reduction in the noise is prioritized on the basis of the noise prioritization factors as the plurality of prioritization factors which are the visual features. The filter strength parameter is determined in each genre information.

In this way, the image encoding unit 4 can overall determine whether the reduction in the noise is prioritized on the basis of the plurality of noise prioritization factors. Therefore, it is possible to set the strength of the filter appropriately.

The filter strength parameter is evaluated so as to be weighted in each noise prioritization factor.

In this way, the image encoding unit 4 can change the prioritization for each noise prioritization factor, in which the reduction in the noise is prioritized, in accordance with the importance. Therefore, it is possible to set the strength of the filter more appropriately.

With such a configuration, the image encoding unit 4 sets the strength of the filter of the deblocking filter when the broadcast program contents are encoded, in accordance with the details of the broadcast program contents indicated by the genre information by using the genre information of the broadcast program contents.

In this way, the image encoding unit 4 can reflect the details of the broadcast program contents which may not be recognized by analyzing the image data S4 on the strength of the filter. Therefore, it is possible to determine the prioritization between the reduction in the noise and the maintenance of the resolution. According to the embodiment of the invention, it is possible to realize the image processing apparatus and the image processing method.

2. Second Embodiment

2-1. Filter-Characteristic Setting Process Using Information Other than Genre Information According to a second embodiment shown in FIG. 8, the same reference numerals are given to the same elements of the first embodiment shown in FIGS. 1 to 7, and the same description is omitted. The second embodiment is different from the first embodiment in that the strength of the filter is changed not only using the genre information but also the information other than the genre information contained in the EPG information S3.

The EPG information S3 contains broadcast station information regarding a broadcast station delivering the broadcast program contents and event information describing the broadcast program contents, as well as the genre information.

As for the broadcast program contents, the resolution of the image data S4 has a tendency to be different due to an apparatus and a technology used in the broadcast station, since the broadcast program contents are photographed and edited by the broadcast station which is a transmission source. In the image data S4 based on the broadcast signal S1 delivered from the broadcast station that is likely to deliver the broadcast program contents with a high resolution, the maintenance of the resolution has to be prioritized. On the contrary, in the image data S4 based on the broadcast signal S1 delivered from the broadcast station that is likely to deliver the broadcast program contents with a low resolution, the reduction in the noise has to be prioritized.

According to the second embodiment, an image encoding unit 104 (not shown) reflects the broadcast station information on the filter strength parameter.

The event information directly describes the details of the broadcast program contents. For example, when the event information contains "live broadcast", "actual scene", or "live remote", the most important in the broadcast program contents may be the live broadcast. In this case, the reduction in the noise has to be prioritized over the maintenance of the resolution.

When a "title of sports" is contained in the event information corresponding to the broadcast program contents belonging to genres, such as movies, dramas, and hobby/cultural shows, except for sports, there is a high possibility that a sports scene is included in at least the important part. In this case, the reduction in the noise has to be prioritized over the maintenance of the resolution.

When the event information of the broadcast program contents belonging to the genre of the documentary/cultural shows contains the place name of a nature or a historic building or the name of a nature or a historic building, a scene of the nature or the historic building is likely to be contained in at least an important part. Examples of the place names of the natural phenomenon or the historic building include the "Grand Canyon" and the "Great Barrier Reef". Examples of the names of the natural phenomenon and the historic buildings include "a coral reef", "a beech forest", "a jungle", "a world heritage site", and "an ancient city". In this case, the maintenance of the resolution has to be prioritized over the reduction in the noise.

When a keyword (hereinafter, referred to as a feature keyword) indicating the visual features of the image data S4 is contained in the event information, the image encoding unit 104 reflects the feature keyword on the filter strength parameter.

When the EPG information S3 is supplied from the EPG information receiving section 31, a genre information receiving section 132 (not shown) corresponding to the genre information receiving section 32 extracts the genre information and the broadcast station information, which correspond to the broadcast program contents being recorded, from the EPG information S3 and supplies the genre information and the broadcast station information to the strength determining section 33.

The genre information receiving section 132 stores the list of the feature keywords indicating the visual features of the image data S4. The genre information receiving section 132 searches the feature keyword from the event information, which corresponds to the broadcast program contents being recorded, from the EPG information S3. The genre information receiving section 132 supplies the feature keyword as well as the genre information and the broadcast station information to a strength determining section 133 corresponding to the strength determining section 33, when the feature keyword is contained in the event information.

The strength determining section 133 stores a score table made by corresponding to a total store and the genre information, instead of the setting table made by corresponding to the strength parameters and the genre information (see FIG. 5). The strength determining section 133 stores an additive coefficient table made by corresponding to the broadcast station information, the feature keyword, and an additive coefficient, as shown in FIG. 8.

The strength determining section 133 selects the total score corresponding to the genre information with reference to the score table. The strength determining section 133 selects the broadcast station information supplied from the genre information receiving section 132 and the additive coefficient corresponding to the feature keyword with reference to the additive coefficient table.

When the genre information is the sports, application of the additive coefficient is excluded due to the fact that the total score is determined on the assumption that a sports scene is already contained. The strength determining section 133 confirms the genre information, when the title of the sports is supplied. The strength determining section 133 selects the additive coefficient, only when the genre information is not sports.

When the genre information is not documentary/cultural shows, it is assumed that the program is not photographed by an apparatus capable of taking high quality pictures. The strength determining section 133 confirms the genre information, when the place name or the name of the nature or the historic building is supplied. The strength determining section 133 selects the additive coefficient, only when the genre information is documentary/cultural shows.

The strength determining section 133 calculates the multiplication score by multiplying the selected total score by the additive coefficient. For example, when the genre information is documentary/cultural shows, the broadcast station information is denoted by "H", "the live broadcast" and "the name of the nature" are supplied as the feature keywords, the total score "5" is multiplied by 0.9 corresponding to "H", "1.2" corresponding to "the live broadcast", and "0.8" corresponding to "the name of the nature". As a consequence, 5×0.9×1.2×0.8=4.32 is calculated as the multiplication score. The strength determining section 133 multiplies the total score corresponding to the genre information by only the additive coefficient corresponding to the broadcast station information, when the feature keyword is not supplied.

The strength determining section 133 has offset values "−9, −6, 0, 6, and 9" of five stages and thus selects one offset value corresponding to the multiplication score. The offset value indicates the filter strength parameter as a value. The values of slice_alpha_c0_offset_div2 and slice_beta_offset_div2 are used without change.

The strength determining section 133 selects "−9" as the offset value, when the multiplication score is "5.0 or less". The strength determining section 133 selects "−6" as the offset value, when the multiplication score is "5.0 or more and 8.0 or less". The strength determining section 133 selects "0" as the offset value, when the multiplication score is "8.0 or more and 10.0 or less". The strength determining section 133 selects "6" as the offset value, when the multiplication score is "larger than 10.0 and smaller than 13.0". The strength determining section 133 selects "9" as the offset value, when the multiplication score is "larger than 13.0".

The strength determining section 133 supplies the selected offset value to the strength setting section 134 (not shown) corresponding to the strength setting section 34. The strength setting section 134 sets the supplied offset value to slice_alpha_c0_offset_div2 and slice_beta_offset_div2. As a consequence, the indexes α and β are selected using the quantization parameter, to which the QP offset is added, to change the strength of the filter.

In this way, the image encoding unit 104 adds the multiplication score to the genre information by calculating the multiplication score and determines the prioritization between the reduction in the noise and the maintenance of the resolution in the image data S4 by using the broadcast station information and the feature keyword.

Accordingly, the image encoding unit 104 can determine the prioritization between the reduction in the noise and the maintenance of the resolution by use of the visual features of the image data S4 that are not obtained from the genre information, and can set the strength of the filter more appropriately.

2-2. Operation and Advantage

With the above configuration, the image encoding unit 104 receives the event information describing the details of the broadcast program contents. The image encoding unit 104 reflects the feature keyword on the filter strength parameter as the characteristic parameter, when the feature keyword indicating the visual features of the image data is contained in the event information.

In this way, since the image encoding unit 104 reflects the feature keyword as well as the genre information to the strength of the filter, it is possible to set the strength of the filter more appropriately, compared to the first embodiment.

The image encoding unit 104 receives the broadcast station information, which is contained in the EPG information S3 and indicates the broadcast station delivering the broadcast program contents, and reflects the broadcast station information indicating the broadcast station delivering the broadcast program contents on the filter strength parameter.

In this way, since the image encoding unit 104 reflects the characteristics of each broadcast station to the strength of the filter, it is possible to set the strength of the filter more appropriately, compared to the first embodiment.

With such a configuration, the image encoding unit 104 can reflect the visual features of the image data S4 on the strength of the filter more appropriately, by reflecting the feature keyword contained in the event information to the filter strength parameter. As a consequence, the image encoding unit 104 can improve the image quality of the bit stream S6 by appropriately adjusting the balance between the maintenance of the resolution and the reduction in the noise.

3. Other Embodiments

In the above-described first and second embodiments, it has been described about the example where the image encoding unit determines the filter strength parameter in accordance with the genre of the large classification to which the broadcast program contents belong. However, the invention is not limited thereto. For example, the characteristic parameter may be determined in accordance with the genre of middle classification to which the broadcast program contents indicated by the genre information belong. In this case, the image encoding unit stores a setting table made by corresponding to the genre of the middle classification and the filter strength parameter and selects the filter strength parameter in accordance with the genre of the middle classification.

In this way, the image encoding unit can classify the broadcast program contents in more detail and thus can select the filter strength parameter more appropriately.

The image encoding unit may have a setting table (see FIG. 9) made by corresponding to the filter strength parameter and exceptional middle classification in which the genre of the middle classification to which the broadcast program contents belong indicates exceptional characteristics to the visual features indicated by the genre of the large classification. When the middle classification to which the broadcast program contents belong is the exceptional middle classification, the image encoding unit determines the filter strength parameter corresponding to the genre of the exceptional middle classification as the filter strength parameter of the broadcast program contents, irrespective of the characteristic parameter corresponding to the genre of the large classification.

The image encoding unit decreases the filter strength parameter, when the middle classification is politics•congress and discussion•talk (news/reports), living/home shows, food/cooking, health/medical care (information/wide shows), classic/opera (music), tour/variety (variety), special effect shooting (animation/special effect shooting), history/travel shows, interview/discussion (documentary/cultural shows), and comedy stories/dramatic performances (the theater/performance). On the other hand, the image encoding unit increases the filter strength parameter, when the middle classification is animation (movies), domestic animation and international animation (animation/special effect shooting), sports (documentary/cultural shows), and dance and ballet (theater/performance). The parenthesis describes the genre of the large classification to which the genre of the middle classification belongs.

In this way, the image encoding unit can perform the deblocking filter process at the appropriate strength of the filter to process the broadcast program contents belonging to the exceptional middle classification that has tendencies different from those of the genre of the large classification.

In the above-described first embodiment, it has been described about the example where the filter strength parameter is selected in accordance with the genre information. However, the invention is not limited thereto. Temporal information regarding the present time may be received to reflect the temporal information on the filter strength parameter. For example, the strength of the filter is set to be larger in the middle of the night at which a lot of low-quality images are delivered.

Figure 10:
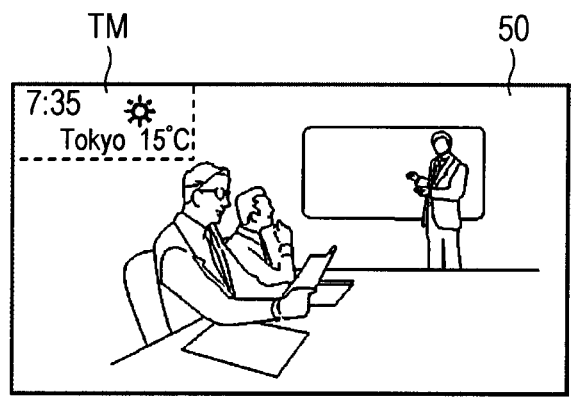
FIG. 10 is a schematic diagram illustrating an exemplary filter-characteristic changing process using temporal information.

As shown in FIG. 10, the image encoding unit determines the filter strength parameter so as to decrease the strength of the filter in time display area TM where time is displayed, when the temporal information falls within the range of predetermined time (for example, AM 5:00 to AM 8:59). At this time, the image encoding unit determines the filter strength parameter in an area except for the time display area TM, as in the first embodiment.

The image encoding unit can maintain the resolution in the time display area TM when text information is displayed in a frame image 50. Therefore, the text information can be displayed clearly on a screen while maintaining the resolution of the text information. In this way, the image encoding unit prevents viewers from noticing low resolution on the whole due to the fact that the text information is unclearly displayed.

In another example different from the example shown in FIG. 10, the strength of the filter may be set low in a caption area where numerous captions are displayed or in the entire areas of the frame image in the genre, such as variety shows, in which captions are frequently used.

In the above-described first and second embodiments, it has been described about the example where the deblocking filter 26 changes the strength of the filter as the filter characteristics. However, the invention is not limited thereto. For example, characteristics such as the number of taps may be changed. Alternatively, as the method of changing the strength of the filter, various methods may be used, as well as the method of changing the values of slice_alpha_c0_offset_div2 and slice_beta_offset_div2. Alternatively, the number of offset values, the offset values, and the method of calculating the offset value are not limited. For example, the offset value may be calculated by multiplying the total score as the filter strength parameter by a predetermined coefficient.

In the above-described first and second embodiments, it has been described about the example where the deblocking filter 26 is used as the filter. However, the invention is not limited thereto. A filter such as an interpolation filter may be used, as long as the filter can reduce the noise occurring in the encoding process.

In the above-described first and second embodiments, it has been described about the example where a digital terrestrial broadcast is delivered. However, the invention is not limited thereto. For example, methods such as stream delivery and on-demand delivery through using the Internet may be applied to various kinds of program contents. Alternatively, the EPG information S3 and the broadcast signal S1 may not be received simultaneously. For example, the EPG information S3 and the broadcast signal S1 may be received separately via a network such as the Internet. In this case, more detailed genre information is likely to be received.

In the above-described first embodiment, has been described the example where the genre information is extracted from the supplied EPG information S3. However, the invention is not limited thereto. For example, the digital tuner unit 3 may supply only the genre information to the image encoding unit 4 and the genre information receiving section 32 may receive the genre information.

In the above-described first and second embodiments, has been described the example where the encoding process is executed in conformity with the standard of H.264/AVC. However, the invention is not limited thereto. The encoding method and the processing details are not limited. The invention is applicable to all encoding methods in which a filter reducing the noise occurring in the encoding process is used in the local decoded image.

In the above-described first embodiment, it has been described about the example where the prioritization of the reduction in the noise is evaluated as the method of evaluating the noise prioritization factor as the prioritization factor. However, the invention is not limited thereto. The prioritization of the maintenance of the resolution may be evaluated. The number of prioritization factors is not limited. One or more arbitrary prioritization factors may be used.

In the above-described second embodiment, it has been described about the example where the filter strength parameter selected in accordance with the genre information is multiplied by the additive coefficient selected in accordance with the broadcast station information and the feature keyword. However, the invention is not limited thereto. Both or one of the broadcast station information and the feature keyword may be reflected on the filter strength parameter. For example, an additive score selected in accordance with the broadcast station information and the feature keyword may be added. Alternatively, the additive coefficient may be selected in accordance with only one of the broadcast station information and the feature keyword. Alternatively, according to an embodiment of the invention, both or one of the broadcast station information and the feature keyword may be reflected on the filter strength parameter without using the genre information. In this case, the filter strength parameter is selected with reference to a setting table made by corresponding to the filter strength parameter and both or one of the broadcast station information and the feature keyword.

In the above-described embodiments, it has been described about the example where the encoding program, the filter-characteristic setting process program, and the like are stored in advance in the ROM or the hard disc drive. However, the invention is not limited thereto. The encoding program, the filter-characteristic setting process program, and the like may be installed from an external memory medium such as a memory stick (registered trademark of Sony Corporation) to a flash memory or the like. Alternatively, the filter-characteristic setting process program or the like may be received from the outside via a USB (Universal Serial Bus) or a wireless LAN (Local Area Network) such as the Ethernet (registered trademark) (Institute of Electrical and Electronics Engineers) 802.11a/b/g, and may be delivered by digital terrestrial television broadcasting or BS digital television broadcasting.

In the above-described embodiments, it has been described about the example where the image processing apparatus 1 serving as an image processing apparatus includes the picture rearrangement buffer 12 and the genre information receiving section 32 serving as a receiving unit; the calculation section 13, the moving prediction compensation section 14, the intra prediction section 15, the orthogonal transform section 17, and the quantization section 18 serving as an encoding unit; quantization section 23, the inverse quantization section 24, the calculation section 25, and the deblocking filter 26 serving as the encoding unit; the strength determining section 33 as a determining unit; and the strength setting section 34 serving as a characteristic changing unit. The image processing apparatus according to the embodiments of the invention may be configured only by the image encoding unit 4, for example, as long as the image processing apparatus includes at least the receiving unit, the determining unit, the characteristic changing unit, and the encoding unit. Alternatively, in an embodiment of the invention, the image processing apparatus may include the receiving unit, the determining unit, the characteristic changing unit, and the encoding unit so as to realize various configurations.

The present application contains subject matter related to that disclosed in Japanese Priority Patent Application JP 2009-140367 filed in the Japan Patent Office on Jun. 11, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
   a storage device; and
   at least one processor coupled to the storage device, the storage device storing software instructions for controlling the at least one processor when executed by the at least one processor, and the at least one processor is operative with the software instructions and is configured to:
   receive image data of program contents and genre information comprising a classification of the program contents;
   determine a characteristic parameter corresponding to the received genre information, the characteristic parameter indicating the strength of a filter filtering a local image obtainable by decoding encoding data, which is generated by encoding the received image data, in accordance with the received genre information, wherein the filter is a deblocking filter reducing block distortion;
   change the strength of the filter in accordance with the determined characteristic parameter, wherein the at least one processor is configured to change the strength of the filter by changing values of slice_alpha_c0_offset_div2 and slice_beta_offset_div2 in accordance with the determined characteristic parameter; and
   generate the encoding data by encoding the received image data by executing a prediction process by use of a local decoded image filtered in accordance with the changed characteristics of the filter, the at least one processor being further configured to:
   receive temporal information identifying a present time; and
   determine the characteristic parameter so as to decrease the strength of the filter in a time display area where time is displayed in the case that the temporal information falls within the range of predetermined time.

2. The image processing apparatus according to claim 1, wherein the at least one processor is further configured to determine the characteristics of the filter in accordance with a visual feature of the image data indicated by the genre information.

3. The image processing apparatus according to claim 1, wherein the at least one processor is further configured to determine the characteristic parameter so as to increase the strength of the filter in the case that the genre information indicates sports.

4. The image processing apparatus according to claim 1, wherein the at least one processor is further configured to determine the characteristic parameter so as to increase the strength of the filter in the case that the genre information indicates music.

5. The image processing apparatus according to claim 1, wherein the at least one processor is further configured to determine the characteristic parameter so as to increase the strength of the filter in the case that the genre information indicates variety shows.

6. The image processing apparatus according to claim 1, wherein the at least one processor is further configured to determine the characteristic parameter so as to decrease the strength of the filter in the case that the genre information indicates documentary/cultural shows.

7. The image processing apparatus according to claim 6, wherein the at least one processor is further configured to:
   encode the image data in conformity with the standard of H.264/AVC.

8. The image processing apparatus according to claim 1, wherein the at least one processor is further configured to:
   receive event information describing the details of the program contents, and
   in the case that the event information contains a feature keyword indicating visual feature of the image data, reflect the feature keyword on the characteristic parameter.

9. The image processing apparatus according to claim 8, wherein the at least one processor is further configured to:
   receive broadcast station information regarding a broadcast station delivering the program contents, and
   reflect the broadcast station information regarding the broadcast station delivering the program contents on the characteristic parameter.

10. The image processing apparatus according to claim 9, wherein the at least one processor is further configured to:
    determine the characteristic parameter in accordance with a genre of large classification to which the program contents belong, and
    in the case that a genre of middle classification to which the program contents belong indicates an exceptional feature to the visual feature indicated by the genre of the large classification, determine a characteristic parameter corresponding to exceptional middle classification as a characteristic parameter of the program contents, irrespective of the characteristic parameter corresponding to the genre of the large classification.

11. The image processing apparatus according to claim 9, wherein the at least one processor is further configured to determine the characteristic parameter in accordance with the genre of the middle classification to which the program contents indicated by the genre information belong.

12. The image processing apparatus according to claim 7, wherein the at least one processor is further configured to:
    receive a broadcast signal containing the program contents and generates the image data;
    store the encoded encoding data; and
    decode the stored encoding data.

13. The image processing apparatus of claim 1, wherein the classification of the program contents comprises at least one of news, sports, drama, music, movies, variety shows, animation, documentaries, theater, cultural programs, and welfare.

14. The image processing apparatus of claim 1, wherein the at least one processor is further configured to:
    receive electronic program guide information associated with the program contents, the electronic program guide information comprising the genre information; and
    obtain the genre information from the received electronic program guide information.

15. The image processing apparatus of claim 1, wherein the at least one processor is further configured to:
    identify a plurality of candidate classifications of the program contents, the candidate classifications having corresponding candidate characteristics parameters;
    identifying one of the candidate classifications that corresponds to the obtained genre information; and
    establish the candidate characteristic parameter associated with the identified candidate classification as the characteristic parameter for the received genre information.

16. An image processing method, comprising the steps of:
receiving image data of program contents and genre information comprising a classification of the program contents;
determining, by at least one processor, a characteristic parameter corresponding to the received genre information, the characteristic parameter indicating the strength of a filter filtering a local image obtainable by decoding encoding data, which is generated by encoding the image data received in the receiving of the image data, in accordance with the genre information received in the receiving of the image data, wherein the filter is a deblocking filter reducing block distortion;
changing, by the at least one processor, the strength of the filter in accordance with the characteristic parameter determined in the determining of the characteristic parameter, wherein changing the strength of the filter is performed by changing values of slice_alpha_c0_offset_div2 and slice_beta_offset_div2 in accordance with the determined characteristic parameter; and
generating, by the at least one processor, the encoding data by encoding the image data received in the receiving of the image data by executing a prediction process by use of a local decoded image filtered in accordance with the characteristics of the filter changed in the changing of the characteristics of the filter, wherein:
the method further comprises receiving temporal information identifying a present time; and
the determining comprises determining the characteristic parameter so as to decrease the strength of the filter in a time display area where time is displayed in the case that the temporal information falls within the range of predetermined time.

17. An image processing apparatus comprising:
a storage device; and,
at least one processor coupled to the storage device, the storage device storing software instructions for controlling the at least one processor when executed by the at least one processor, and the at least one processor is operative with the software instructions and is configured to:
receive image data of program contents, genre information regarding the program contents, event information describing the details of the program contents, and temporal information regarding present time;
determine a characteristic parameter indicating characteristics of a filter filtering a local image obtainable by decoding encoding data, which is generated by encoding the received image data, in accordance with the received genre information and a visual feature of the image data indicated by the genre information, wherein the characteristic parameter indicates the strength of the filter;
change the characteristics of the filter in accordance with the determined characteristic parameter;
generate the encoding data by encoding the received image data by executing a prediction process by use of a local decoded image filtered in accordance with the changed characteristics of the filter; and
wherein the at least one processor is further configured to:
reflect the temporal information on the characteristic parameter,
determine the characteristic parameter so as to decrease the strength of the filter in a time display area where time is displayed in the case that the temporal information falls within the range of predetermined time, and
in the case that the event information contains a feature keyword indicating visual feature of the image data, reflect the feature keyword on the characteristic parameter.

* * * * *